(12) United States Patent
Ehlmé

(10) Patent No.: US 8,191,170 B2
(45) Date of Patent: Jun. 5, 2012

(54) MATERIAL FOR A DRYSUIT

(75) Inventor: Göran Ehlmé, Henån (SE)

(73) Assignee: Waterproof Diving International AB, Partille (SE)

( * ) Notice: Subject to any disclaimer, the term of this patent is extended or adjusted under 35 U.S.C. 154(b) by 294 days.

(21) Appl. No.: 12/530,508

(22) PCT Filed: Mar. 14, 2008

(86) PCT No.: PCT/SE2008/050287
§ 371 (c)(1),
(2), (4) Date: Sep. 9, 2009

(87) PCT Pub. No.: WO2008/118070
PCT Pub. Date: Oct. 2, 2008

(65) Prior Publication Data
US 2010/0100994 A1 Apr. 29, 2010

(30) Foreign Application Priority Data

Mar. 23, 2007 (SE) ...................................... 0700719

(51) Int. Cl.
*B63C 11/04* (2006.01)
*B63C 11/02* (2006.01)
(52) U.S. Cl. .................................. 2/2.16; 2/2.15; 2/2.17
(58) Field of Classification Search ...................... 2/2.15, 2/2.16, 2.17
See application file for complete search history.

(56) References Cited

U.S. PATENT DOCUMENTS

| | | | | |
|---|---|---|---|---|
| 1,588,635 A | * | 6/1926 | Webb | 441/57 |
| 2,749,551 A | * | 6/1956 | Garbellano | 2/82 |
| 2,981,954 A | * | 5/1961 | Garbellano | 2/2.17 |
| 3,081,517 A | * | 3/1963 | Driesch | 428/91 |
| 3,284,806 A | * | 11/1966 | Prasser | 2/2.16 |
| 3,323,959 A | | 6/1967 | Kreckl | |
| 3,374,142 A | * | 3/1968 | Kreckl | 428/102 |
| 4,274,158 A | * | 6/1981 | Pogorski et al. | 2/2.16 |
| 4,547,904 A | | 10/1985 | Long et al. | |
| 4,741,050 A | * | 5/1988 | O'Kane et al. | 112/413 |
| 4,862,517 A | * | 9/1989 | Meistrell | 2/2.17 |
| 5,196,240 A | * | 3/1993 | Stockwell | 427/389.9 |
| 5,282,277 A | * | 2/1994 | Onozawa | 2/69 |

(Continued)

FOREIGN PATENT DOCUMENTS

GB 2162044 A 1/1986

(Continued)

OTHER PUBLICATIONS

Swedish Patent Office, Int'l Search Report in PCT/SE2008/050287, Jul. 1, 2008.

(Continued)

*Primary Examiner* — Bobby Muromoto, Jr.

(74) *Attorney, Agent, or Firm* — Potomac Patent Group PLLC

(57) ABSTRACT

A drysuit for diving and other wet activities includes an outer waterproof layer and an inner insulating layer. On the inside of the outer waterproof layer, which can be butyl rubber or polyurethane, there is received a detachably attached three-dimensional polyester textile that is flexible and has air throughput capacity in two directions. Thus, a diving suit of the dry type is provided that has good properties for carrying away moisture and sweat from a diver and works well at all depths, and that above all feels pleasant and comfortable for the diver to use.

17 Claims, 8 Drawing Sheets

U.S. PATENT DOCUMENTS

Figure 2:
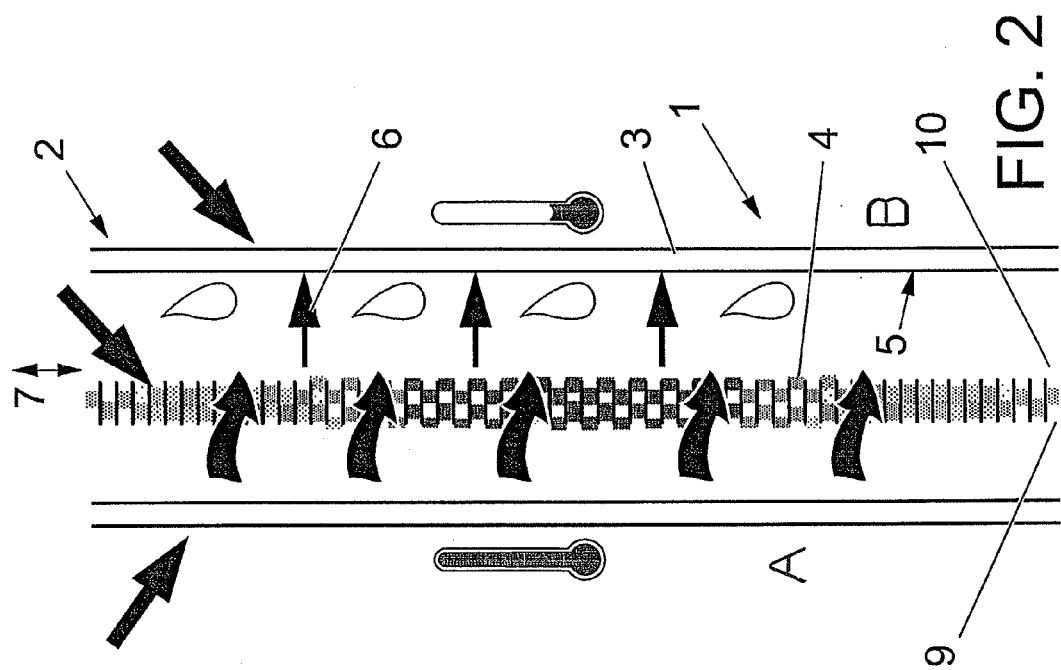

| | | | |
|---|---|---|---|
| 5,385,036 A * | 1/1995 | Spillane et al. | 66/87 |
| 5,630,229 A * | 5/1997 | Machado et al. | 2/2.15 |
| 5,896,578 A * | 4/1999 | Hunter et al. | 2/2.15 |
| 5,898,934 A * | 5/1999 | Hunter et al. | 2/2.15 |
| 6,120,530 A | 9/2000 | Nuckols et al. | |
| 6,675,389 B1 * | 1/2004 | Kublick | 2/2.17 |
| 7,096,506 B2 * | 8/2006 | Ragot | 2/2.15 |
| 7,395,553 B2 * | 7/2008 | O'Hara | 2/2.15 |
| 7,631,363 B2 * | 12/2009 | Myerscough | 2/2.15 |
| 7,743,428 B2 * | 6/2010 | O'Hara | 2/2.16 |
| 7,992,218 B2 * | 8/2011 | O'Hara | 2/2.15 |
| 2001/0014981 A1 * | 8/2001 | Fairhurst et al. | 2/69 |
| 2001/0025383 A1 * | 10/2001 | Thompson | 2/69 |
| 2001/0047530 A1 * | 12/2001 | Griffiths | 2/2.17 |
| 2002/0108160 A1 * | 8/2002 | Griffiths | 2/2.15 |
| 2003/0157853 A1 * | 8/2003 | Huber | 442/76 |
| 2003/0172429 A1 * | 9/2003 | Chuang | 2/2.15 |
| 2003/0173698 A1 * | 9/2003 | Chuang | 264/139 |
| 2003/0182704 A1 * | 10/2003 | Sunada et al. | 2/2.15 |
| 2004/0177427 A1 * | 9/2004 | Pedrick | 2/82 |
| 2004/0237599 A1 * | 12/2004 | Kondou et al. | 66/202 |
| 2004/0253891 A1 * | 12/2004 | Schierenbeck et al. | 442/268 |
| 2005/0005337 A1 * | 1/2005 | Yokoyama | 2/2.15 |
| 2005/0028241 A1 * | 2/2005 | Ragot | 2/69 |
| 2005/0071905 A1 * | 4/2005 | Polak et al. | 2/2.16 |
| 2005/0102862 A1 * | 5/2005 | Baychar | 36/55 |
| 2005/0155128 A1 * | 7/2005 | Hayes | 2/2.15 |
| 2005/0227584 A1 * | 10/2005 | Stachowski | 450/57 |
| 2005/0284560 A1 * | 12/2005 | Chuang | 156/155 |
| 2006/0260018 A1 * | 11/2006 | Gordon et al. | 2/2.5 |
| 2007/0067886 A1 * | 3/2007 | Hunter et al. | 2/2.16 |
| 2007/0186326 A1 * | 8/2007 | Myerscough | 2/69 |

FOREIGN PATENT DOCUMENTS

| | | |
|---|---|---|
| GB | 2353694 A | 3/2001 |
| WO | 2004/065114 A2 | 8/2004 |
| WO | WO 2004069649 A1 * | 8/2004 |

OTHER PUBLICATIONS

Swedish Patent Office, Int'l Prelim. Report on Patentability in PCT/SE2008/050287, Sep. 29, 2009.

* cited by examiner

MATERIAL FOR A DRYSUIT

The present invention relates to a device in a drysuit for diving and other wet activities and comprising an outer waterproof layer and an inner insulating layer.

Drysuits for divers usually are available in two types, variable volume (neoprene foam and compressed neoprene foam and that herein is denominated neoprene drysuit) and with constant volume (bi/tri laminate, butyl rubber, cordura, etc.) usually denominated fabric suit, shell suit or laminate suit but that herein is denominated shell drysuit. The principal differences between the same are that suits having variable volume have better insulating properties, but the buoyancy varies with the depth, because of the compression of the gas bubbles in the neoprene material. On the other hand, the constant-volume suit requires separate underwear, but the buoyancy is much easier to control and is only affected by the type and amount of underwear.

Which type of suit a diver chooses is a matter of personal preference. Drysuits of neoprene are often used by divers who dive in very cold water, while shell drysuits often are used by divers using a closed air supply, so-called rebreather divers.

By, for instance, WO 2004/065114 A2, a wetsuit for divers is previously known and that comprises an internal central layer formed of three-dimensional fibres, having an inner and an outer layer, respectively, that are substantially impermeable to water vapour and water. Said three-dimensional textile comprises a bonding composition intended to make the wetsuit waterproof in order to prevent the material in the suit from rotting.

However, such a suit is not suitable as a dry-suit, since moisture from the user stays on the user, which makes that he or she would become very wet in such a drysuit.

U.S. Pat. No. 2,957,512 A also discloses a material that, among other things, is suitable for bathing suits and such are, of course, usually wet in the water. Neither this material solves the above-mentioned problem of sweat and moisture in drysuits.

U.S. Pat. No. 3,562,079 A discloses a non-woven cover material that primarily is intended to resist impacts and that comprises a three-dimensional core in the inside thereof. This material is not very suitable for diving suits.

Therefore, the main object of the present invention is primarily to solve, among other things, the above-mentioned problems to provide a diving suit of dry type and that has good properties for carrying away moisture and sweat from the diver and allowing to obtain a suit that works well at all depths, and that above all feels pleasant and comfortable for the diver to use.

Said object is attained by means of a device according to the present invention that essentially is characterized in that, on the inside of the outer waterproof layer, which consists of butyl rubber or polyurethane, there is received a detachably attached three-dimensional textile consisting of polyester and that is flexible and has air throughput capacity in two directions.

Figure 1:
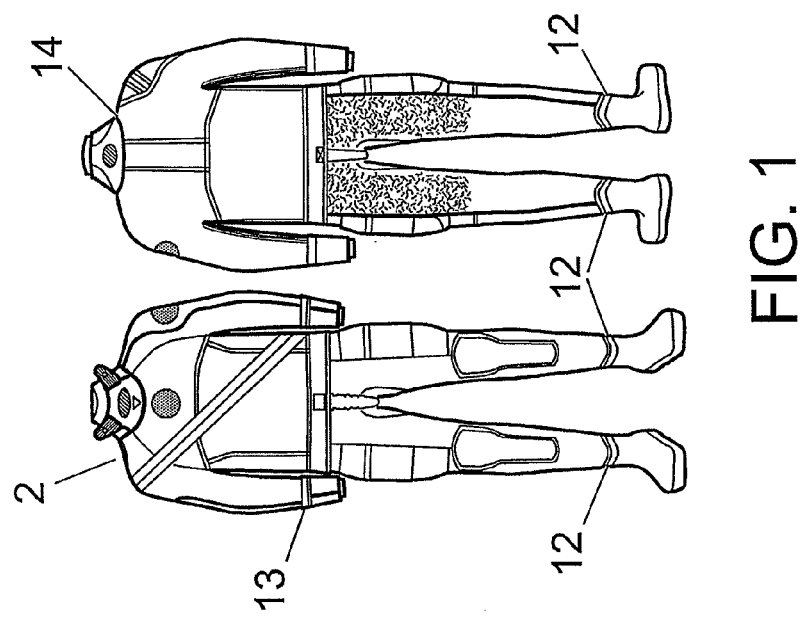
Figure 2A:
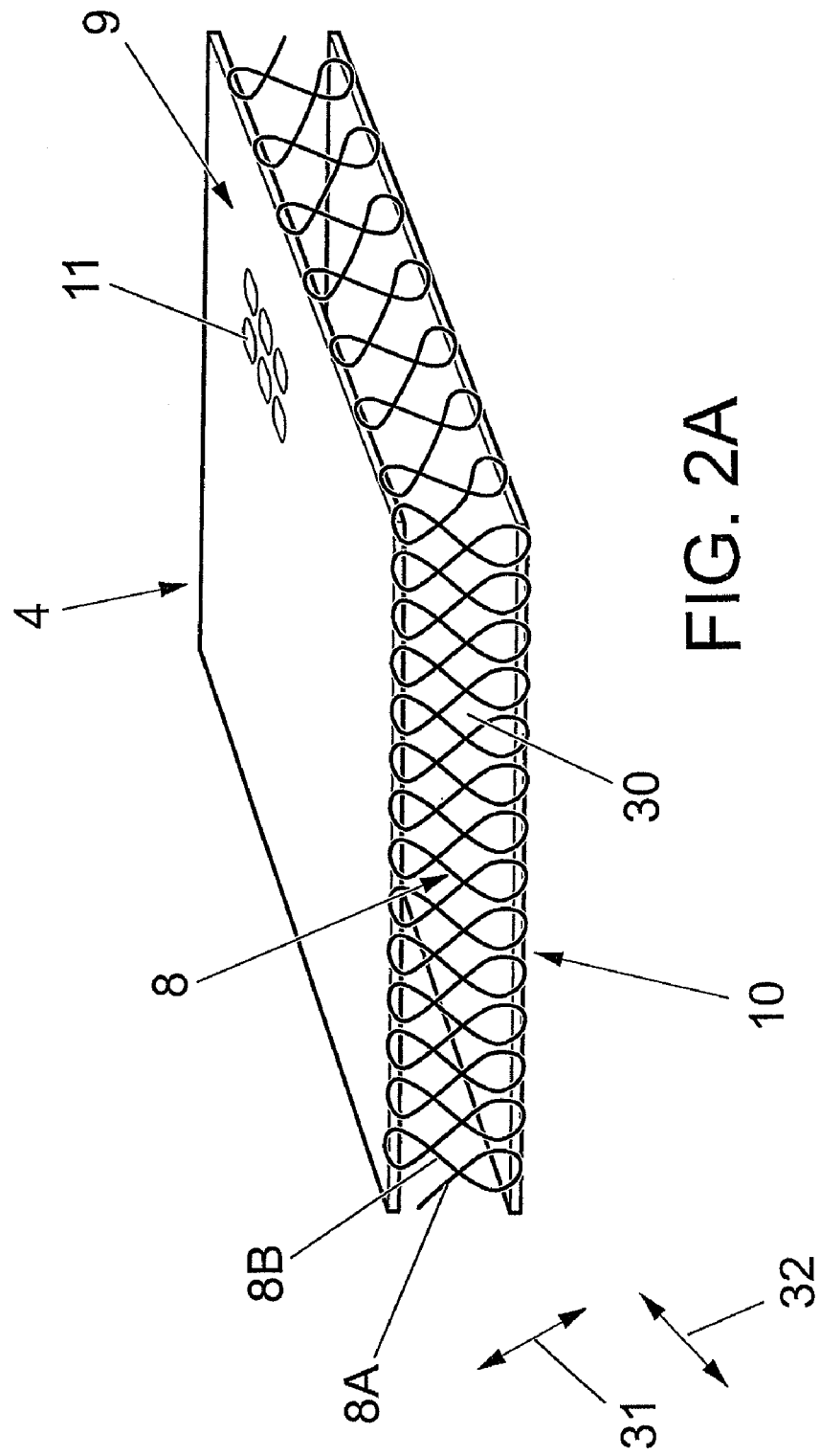
Figure 3:
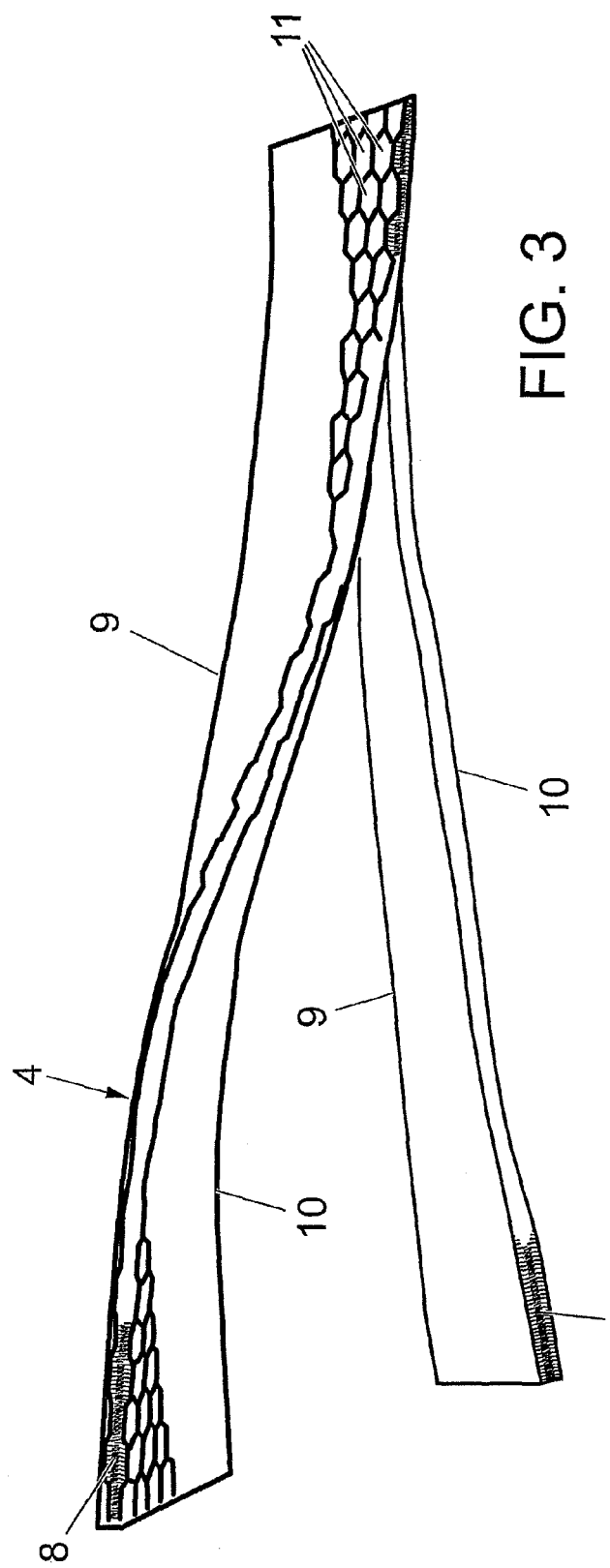
Figure 4:
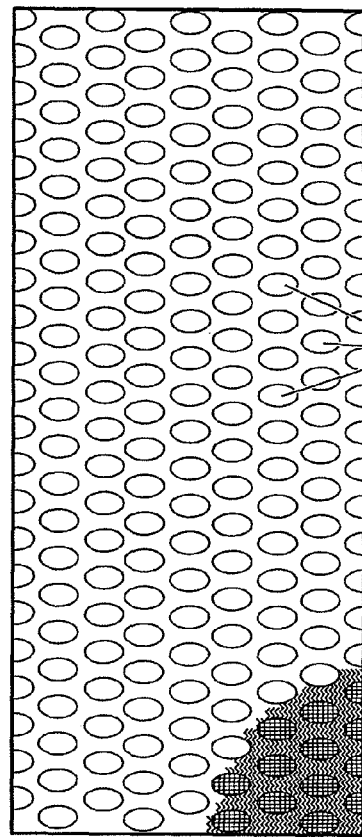
Figure 4:
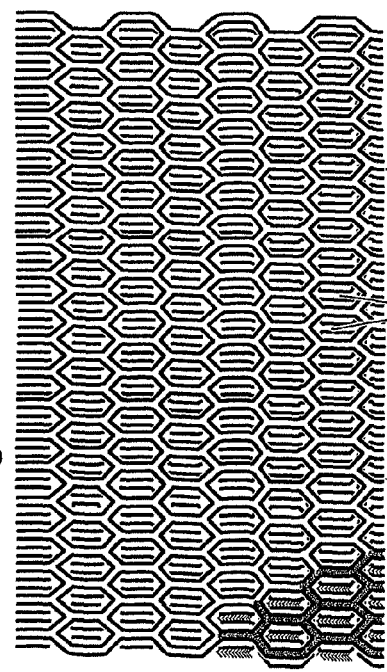
Figure 5:
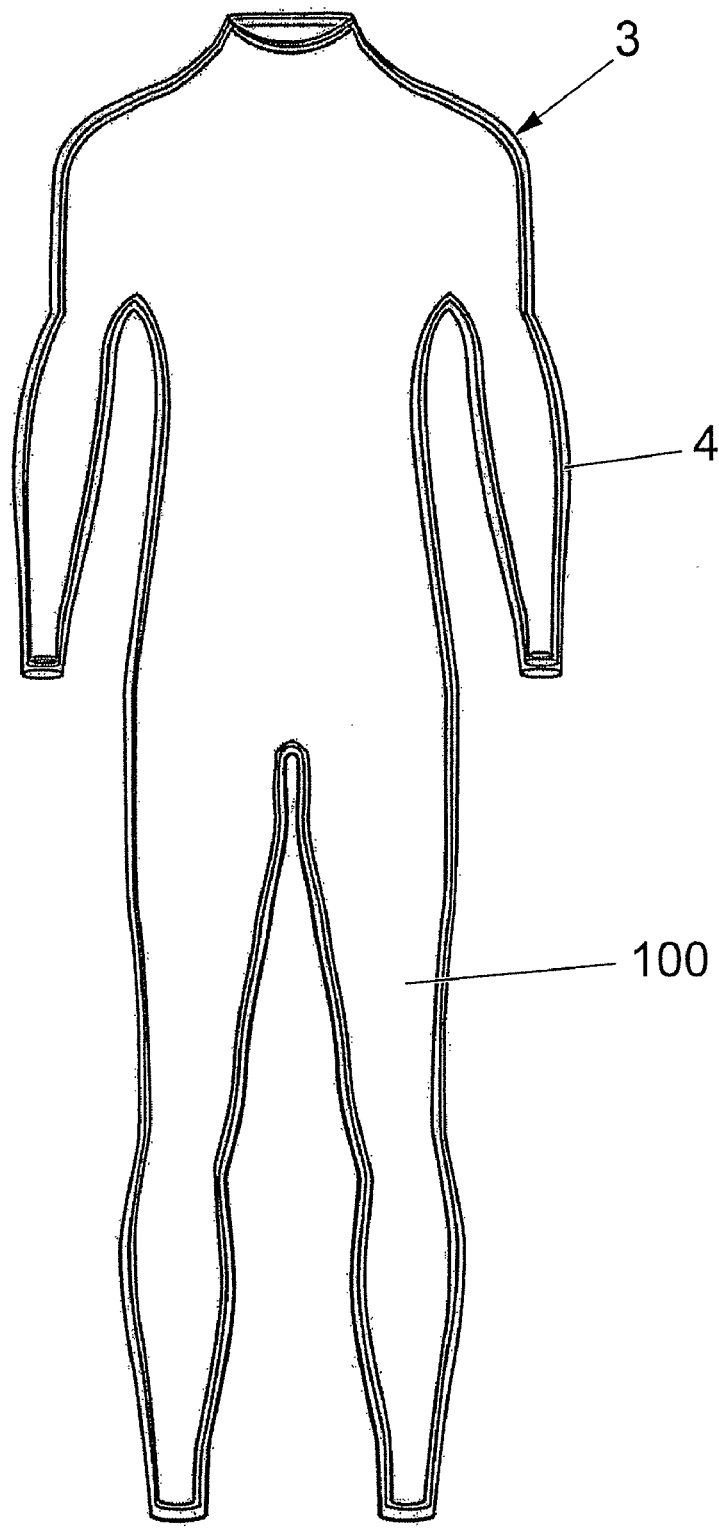
Figure 6:
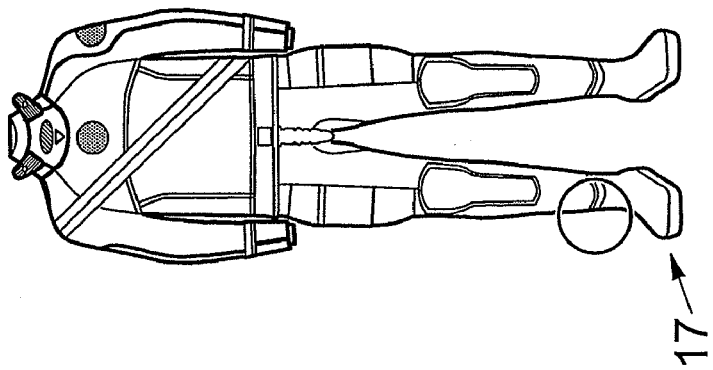
Figure 6:
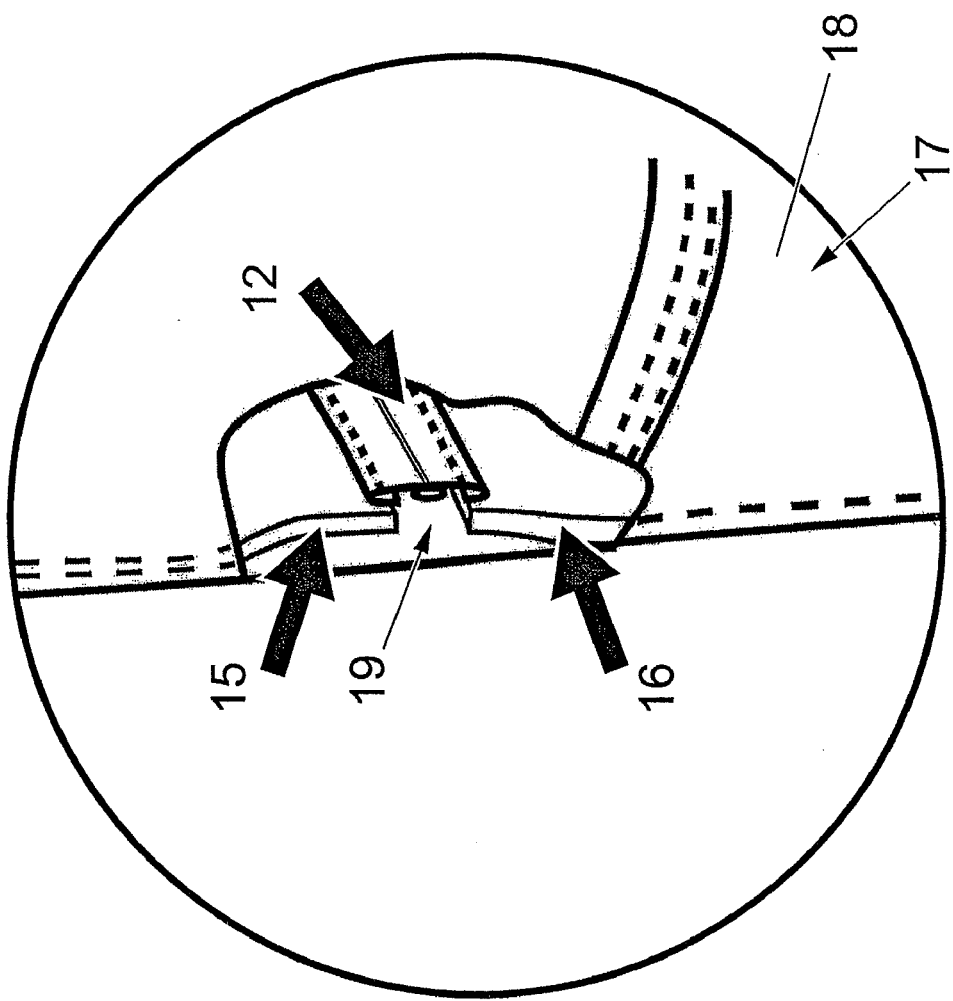
Figure 7:
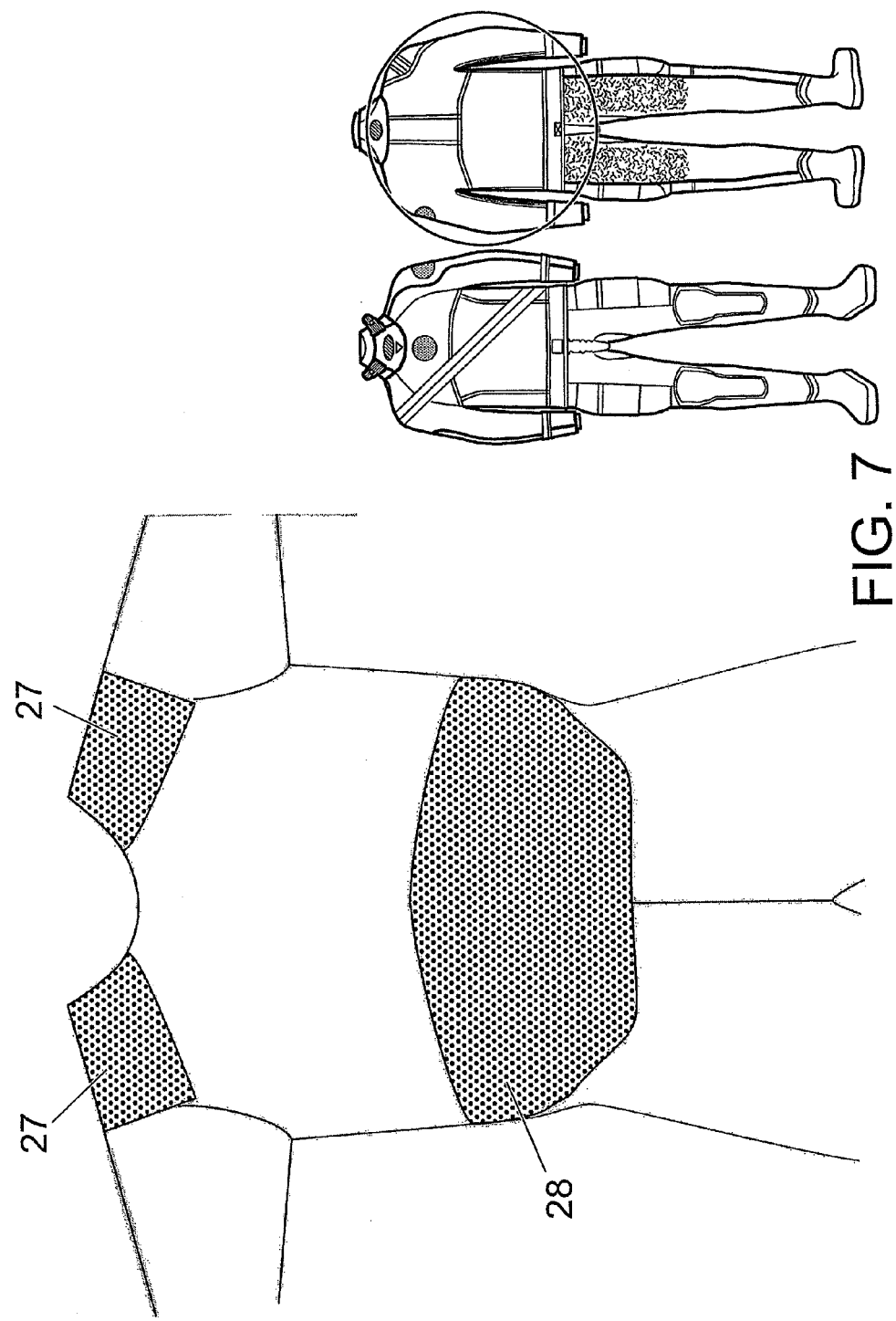
Figure 8:
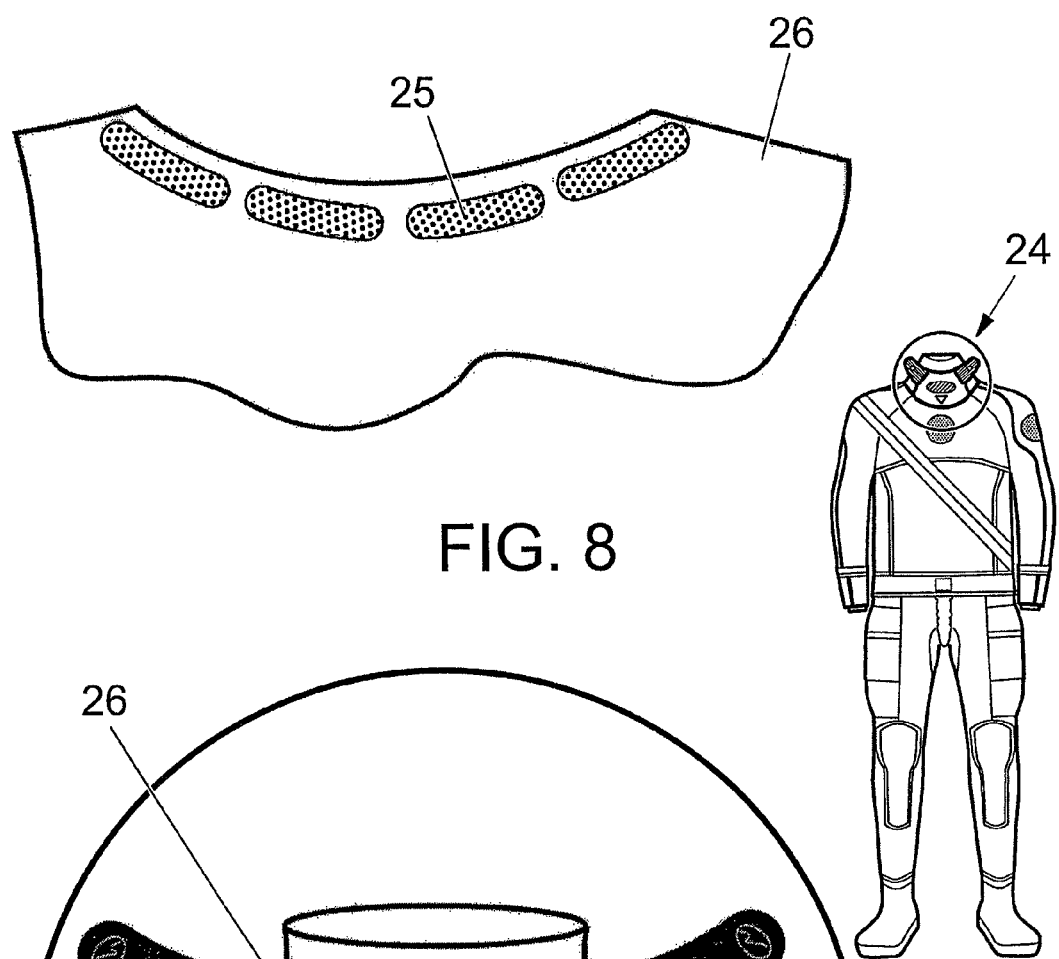
Figure 8:
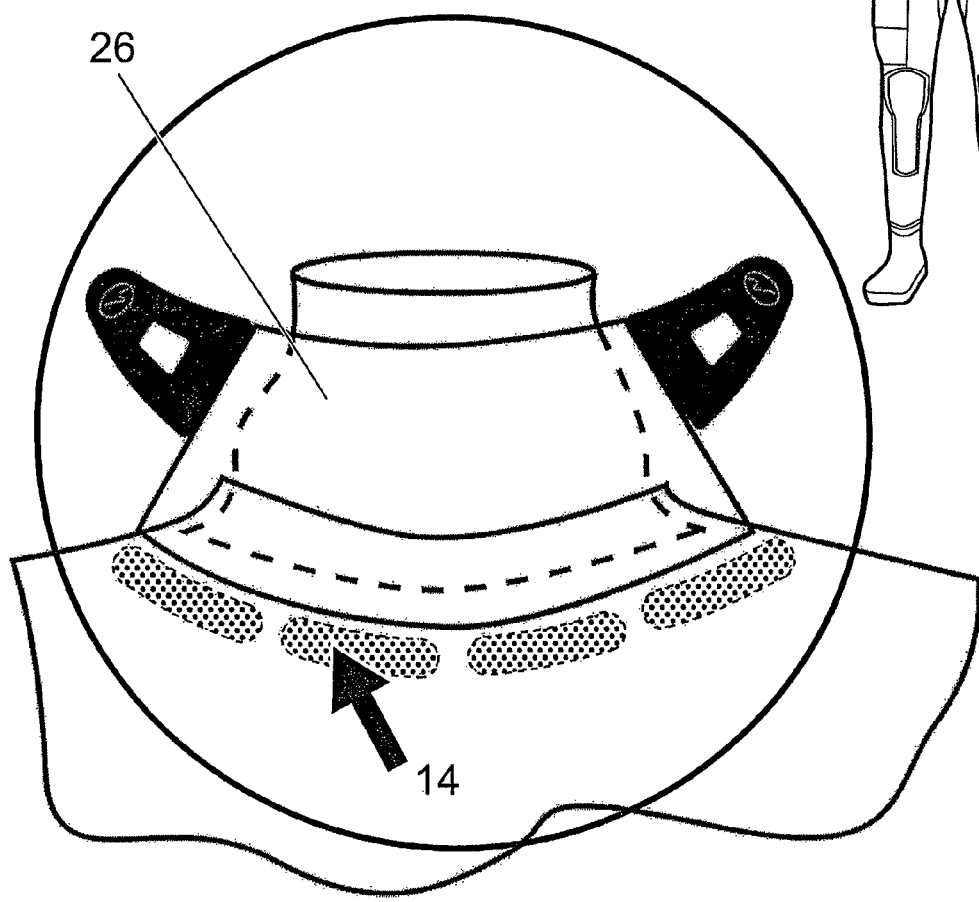
Figure 9:
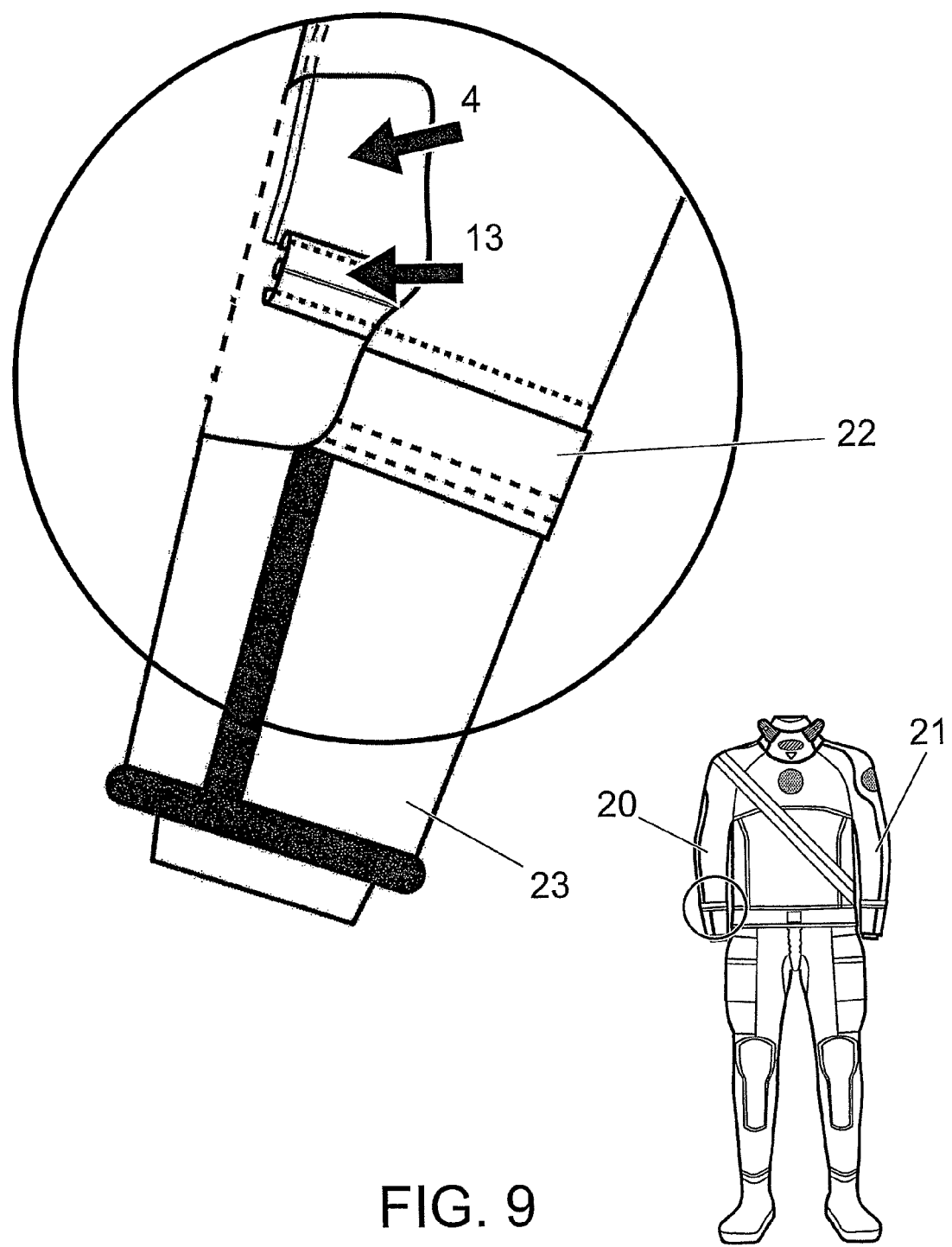

The invention is described below in the form of a preferred embodiment example, reference being made to the accompanying drawings, in which, FIG. 1 shows examples of a diving suit according to the invention as seen from the front and from behind, respectively, FIG. 2 schematically shows a cross-section of the suit material and the process in the same in the active ventilation state, FIG. 2A shows in perspective said ventilation layer, FIGS. 3-4 show two examples of inwardly turned material layers of the suit, FIG. 5 shows an example of the shape and structure of the suit, FIG. 6 shows the connection of the layers of the suit at the leg, FIG. 7 shows examples of the reinforced back part of the suit, FIG. 8 shows the connection of the layers of the suit at the neck collar, and FIG. 9 shows the connection of the layers of the suit at the lower part of the sleeve.

The main idea of the invention is to combine advantages existing in known solutions of materials for diving suits of varying type, i.e., the advantages of the neoprene drysuit and of the shell drysuit, respectively. This is enabled by combining an inner insulating gas-filled layer, similar to that of a neoprene drysuit, with an outer layer of a shell dry-suit, and allowing to detachably interconnect the same, whereby desired unexpected technical effects are obtained and attained.

This is possible thanks to the internal three-dimensional layer, which consists of polyester, being received by the external waterproof layer of butyl rubber, and the same being detachably attached to each other, and which allows moisture from within the suit to be carried into the inner layer and received therein, while the outer layer prevents water penetration from the outside into the suit.

The idea of this new type of hybrid suit is to combine the advantages of the two. This is provided by an inner lining of a three-dimensional (3D) mesh interlining fabric. It is formed of a structure of two layers, with an accumulation of threads between the same, see FIG. 2A, and having different strength and thickness. The hardness and the elasticity characteristics can be adapted to suit different needs.

The three-dimensional (3D) fabric is manufactured from polyester and is pliable. It has excellent forming and recovery properties and has extremely high air throughput in two directions (7, 6) and constant circulation of air combined with low weight. It has a soft damping and pleasant effect, which makes it very comfortable.

The three-dimensional (3D) lining can be entirely integrated with the outer layer of butyl rubber or polyurethane, attached by zippers or by Velcro fastening members, see FIGS. 6, 8 and 9. Although the two fabrics are separated from each other, which makes the suit very flexible, the diver will experience the suit as one. It can also be changed to be used in different climates.

In FIGS. 3 and 4, three-dimensional (3D) lining is shown, having different thickness and shape on the outside and on the inside, respectively. The upper shown layer is much thicker than the lower shown layer, however, they are not interconnected but just shown in the same picture.

The effect of these combined materials, formed by "layer on layer", see FIG. 5, will give a dry suit having very good insulation properties, without any variation of the buoyancy.

There are also other advantages. Since a drysuit is not ventilated to get rid of body moisture, the climate and comfort will be deteriorated after a short time when the suit is used, particularly ashore before descending under water. In a neoprene suit, the inner fabric will absorb the body moisture, and this results in a suit that will be totally wet on the inside. It will also take long time to dry the suit after the diving is finished. In a laminated suit, there is usually no fabric on the inside, which results in body moisture condensing on the surface and being absorbed back into the underwear.

By means of this new type of suit, the moisture can be absorbed or condensed on the inner surface of the outer part of the suit, but the three-dimensional (3D) lining forms a distance that prevents moisture from being absorbed by clothes or contacting the skin directly, which gives a much better climate for the diver. See FIG. 2.

When the pressure increases with the depth, the air in the suit will be compressed and create a vacuum. The three-dimensional (3D) lining resists this vacuum to a certain extent and reduces the squeezing effect on the body. To improve the comfort even more, the three-dimensional (3D) inner lining may be constructed of panels having different strength and thickness, actually in order to reduce the pressure from the weight belt at the back of the shoulders. See FIG. 7.

There is also a safety aspect. There have been several incidents, where too tightly tight-fitting underwear has blocked the outlet valve of the suit, and prevented the air from leaving the suit. This results in too a fast ascending to the surface, thereby causing aeroembolism (caisson disease). Since this three-dimensional (3D) thread-shaped fabric ensures free air throughput all the way through the walls of the suit, said blocking of the outlet valve cannot occur.

At least the three-dimensional (3D) thread accumulation could be usable as an internal lining on other suits, such as rescue, fire and commercial diving suits. The physical property of great air permeability could give advantages, such as providing cooling for firemen or providing warming of commercial divers. This can be provided by laminating a PU film (polyurethane film) on each side of the three-dimensional (3D) thread accumulation. It could be a circulation of air in the proper fabric, either cold or heat, depending on in which area the suit is used. In other words, an active cooling/warming lining could be applicable in any suit.

The neoprene boots are glued to the inside of the manufactured suit. At the top of the boots, there is a wound zipper attached/sewed on in a reverse way. See FIG. 6. The interlining is adhered at the top of the wound zipper. Since the zipper is sewed on in a reverse manner, the slider and the zipper coil can be placed between the suit and the lining, which provides a very smooth inside of the joint. This is essential since it has to be very easy to get dressed without the foot gets jammed as soon as the diver pulls the suit over his/her foot. The zipper coil is of the type YKK coil No. 3.

One side of the zipper coil is attached on the inside of the outer suit as near the latex seam as possible or on the other side of the zipper coil where the interlining is attached. Since the zipper is attached in a reverse way, the slider and the zipper coil will be sewed on between the suit and the lining, which provides a very smooth inside of the joint. This is substantial since it has to be very easy to get dressed without the foot gets jammed as soon as the diver pulls the suit over his/her foot. The zipper coil is of the type YKK coil No. 3. See FIG. 9.

The inner lining is attached to the neck seal by means of a pre-formed Velcro fastening member around the rubber seal. On the lining, the Velcro fastening member is knitted, and on the suit, a Velcro fastening member is used with a hot-melt adhesive. The Velcro fastening member is implemented in many smaller pieces, which together form the circle around the neck seal. See FIG. 8.

The interlining textile may be manufactured from many different panels that have different thicknesses and different elasticity characteristics, for instance at the back side of the waist where the diver carries his/her weight belt and that often has a weight of 12-16 kg. Underneath the weight belt, the interlining textile may be thick, up to 10 mm, and have twice as great resistance to pressure/weight as the rest of the suit. Also the shoulders could have a thickness of 6-8 mm to resist the weight from the hard tank. Usually, the interlining textile has a thickness of 3-4 mm. See FIG. 7.

The condensed moisture between the body and the interlining textile will be carried through the interlining textile and the condensate deposits on the cold surface on the inside of the outer part of the suit. This will lead to a drier climate inside the proper suit, and the body will remain dry since the wet surface will be kept at a distance from the skin by means of the interlining textile. The interlining textile has another great advantage, which is that the suit dries extremely fast after the dive thanks to the adapted air-permeable textile, which the interlining textile makes. See FIGS. 1-2.

The invention consists of a device 1 in a dry-suit 2 intended for diving and other wet activities, such as, e.g., water-skiing, surfing, sailing, etc., and which comprises an outer waterproof layer 3, and an inner insulating layer 4. According to the invention, a detachably attached three-dimensional textile 4 is received on the inside 5 of the outer waterproof layer 3, which consists of butyl rubber or of polyurethane. Said three-dimensional textile, 4, consists of polyester and is flexible and has air throughput capacity in two directions, viz. in the direction 6 perpendicularly to the outer layer 3 and in the direction 7 parallel to the outer layer 3, respectively.

Said three-dimensional textile 4 is formed of a structure having a mass of threads 8 surrounded from a respective substantially parallel side A and B, respectively, by a respective layer of inner and outer, respectively, side 9 and 10, respectively. In that connection, at least one 9 of said layers 9, 10 has a pattern with a plurality of larger openings 11, 11 that extend from the outside into said internally situated mass of threads 8. This layer 9 is the inner layer and is intended to abut directly against the diver's body, which either is bare or provided with underwear of a suitable type. Said mass of threads 8 has a plurality of inclined, substantially parallel threads 8A, 8B, and most of said inclined threads 8A, 8B are leaning in common direction, or intersect each other.

If it is desired that said three-dimensional textile material 4 should get a stiffer and thus an improved supporting capacity, and in a better way be able to resist outer forces without being compressed and hence decrease the intermediate space 30 where the threads 8 are situated, it is possible to allow the threads to consist of stiffer materials and/or increase the dimension of the same. Even better stiffness is obtained by, e.g., allowing half of the threads 8A to lean in a common first direction 31, while the remaining amount of threads 8B are leaning in another common second direction 32 that intersects said first direction 31, i.e., all threads do not lean in a common direction.

One 10 of said layers 9, 10 has a denser textile surface than the inner surface 9 and that is facing the inside 5 of the outer layer 3 of the suit. The internally formed lining 4 is attached to the external outer surrounding waterproof layer 3 by means of a number of zippers 12, 13 and/or Velcro fastening members 14. A zipper 12 is attached by, for instance, needlework, on a connecting edge 15 of the insulating three-dimensional layer 4 and an outward edge 16 of connecting boots 17, included in the suit 2, on the boot leg 18 thereof in the space 19 between the same.

Furthermore, an additional zipper 13 is attached by, for instance, needlework, on a portion of the three-dimensional insulated layer 4 of the respective sleeve 20, 21 and on the inside 22 of the waterproof layer of the outer portion 23 of the respective sleeve.

Thereby, the different parts are efficiently united, and in addition in a waterproof way.

In the area of the 2 neck portion 24 of the suit, the Velcro fastening members 14 are sewed on. Said Velcro fastening members 14 are arranged to be detachably and, in a waterproof way, detachably interconnectable with paste-on Velcro fastening members 25 of a neck collar 26 interconnectable with said suit 2.

In order for the diver 100 to avoid unnecessary pain by weighty air tubes, weight belts and other equipment, the three-dimensional insulating layer 4 may be formed of a plurality of composed stiffer parts 27, 28 in the area over the diver's shoulders, i.e., at the shoulder portions of the suit, and in the area over the diver's lower back portion, i.e., at the rear waist portion of the suit, respectively, and which are intended to carry the pressure from said worn apparatuses, etc.

By, in that connection, choosing a said three-dimensional textile having a stiffer intermediate portion of thread mass 8, it is possible to, in a better way, carry the pressure from supported outer apparatuses and pressing parts. This makes it achievable, in spite of a large load, to get an air gap in the textile, and that entails that air still can be received therein for ventilation and insulation purposes.

Naturally, the invention is not limited to the embodiments described above and shown in the accompanying drawings. Modifications are feasible, particularly as for the nature of the different parts, or by using an equivalent technique, without departing from the protection area of the invention, such as it is defined in the claims.

The invention claimed is:

1. A device for a drysuit for wet activities, comprising:
an outer waterproof layer of butyl rubber or polyurethane, and
an inner, three-dimensional, insulating, polyester layer detachably attached on an inside of the outer layer,
wherein the inner layer is flexible, has air throughput capacity in two directions, has a structure having a mass of threads surrounded by inner and outer side layers, and at least one of the inner and outer side layers has a pattern with openings extending into the mass of threads.

2. The device of claim 1, wherein the mass of threads includes a plurality of inclined threads.

3. The device of claim 2, wherein one of the inner and outer side layers has a denser textile surface than the other one of the inner and outer side layers.

4. The device of claim 2, wherein most of the inclined threads are counter-directed with respect to one another such that they intersect one another.

5. The device of claim 2, wherein the inner layer is detachably attached to the outer layer by a number of zippers or hook-and-loop fastener members.

6. The device of claim 1, wherein one of the inner and outer side layers has a denser textile surface than the other one of the inner and outer side layers.

7. The device of claim 6, wherein the inner layer is detachably attached to the outer layer by a number of zippers or hook-and-loop fastener members.

8. The device of claim 1, wherein the inner layer is detachably attached to the outer layer by a number of zippers and/or hook-and-loop fastener members.

9. The device of claim 8, wherein a zipper is attached to an outward edge of the inner layer and to a boot-leg portion of a connecting boot in a space between the same.

10. The device of claim 9, wherein the inner layer is detachably attached to the outer layer by a number of zippers, and a zipper is attached to the inner layer of a sleeve and on an inside of the outer layer of the sleeve.

11. The device of claim 9, wherein hook-and-loop fastener members are sewed on the inner layer in an area of a neck portion of the drysuit, and the hook-and-loop fastener members are adapted to be interconnected with pasted-on hook-and-loop fastener members of an interconnectable neck collar.

12. The device of claim 8, wherein the inner layer is detachably attached to the outer layer by a number of zippers, and a zipper is attached to the inner layer of a sleeve and on an inside of the outer layer of the sleeve.

13. The device of claim 12, wherein hook-and-loop fastener members are sewed on the inner layer in an area of a neck portion of the drysuit, and the hook-and-loop fastener members are adapted to be interconnected with pasted-on hook-and-loop fastener members of an interconnectable neck collar.

14. The device of claim 8, wherein hook-and-loop fastener members are sewed on the inner layer in an area of a neck portion of the drysuit, and the hook-and-loop fastener members are adapted to be interconnected with pasted-on hook-and-loop fastener members of an interconnectable neck collar.

15. The device of claim 8, wherein one of the inner and outer side layers has a denser textile surface than the other one of the inner and outer side layers.

16. The device of claim 1, wherein the inner layer comprises a plurality of portions that have different respective thicknesses and stiffnesses.

17. The device of claim 16, wherein thicker portions are arranged at at least one of a rear waist portion of the drysuit and on shoulder portions of the drysuit.

* * * * *